Nov. 19, 1935.    L. J. LARSON    2,021,628
ARC WELDING ELECTRODE
Filed Nov. 2, 1934
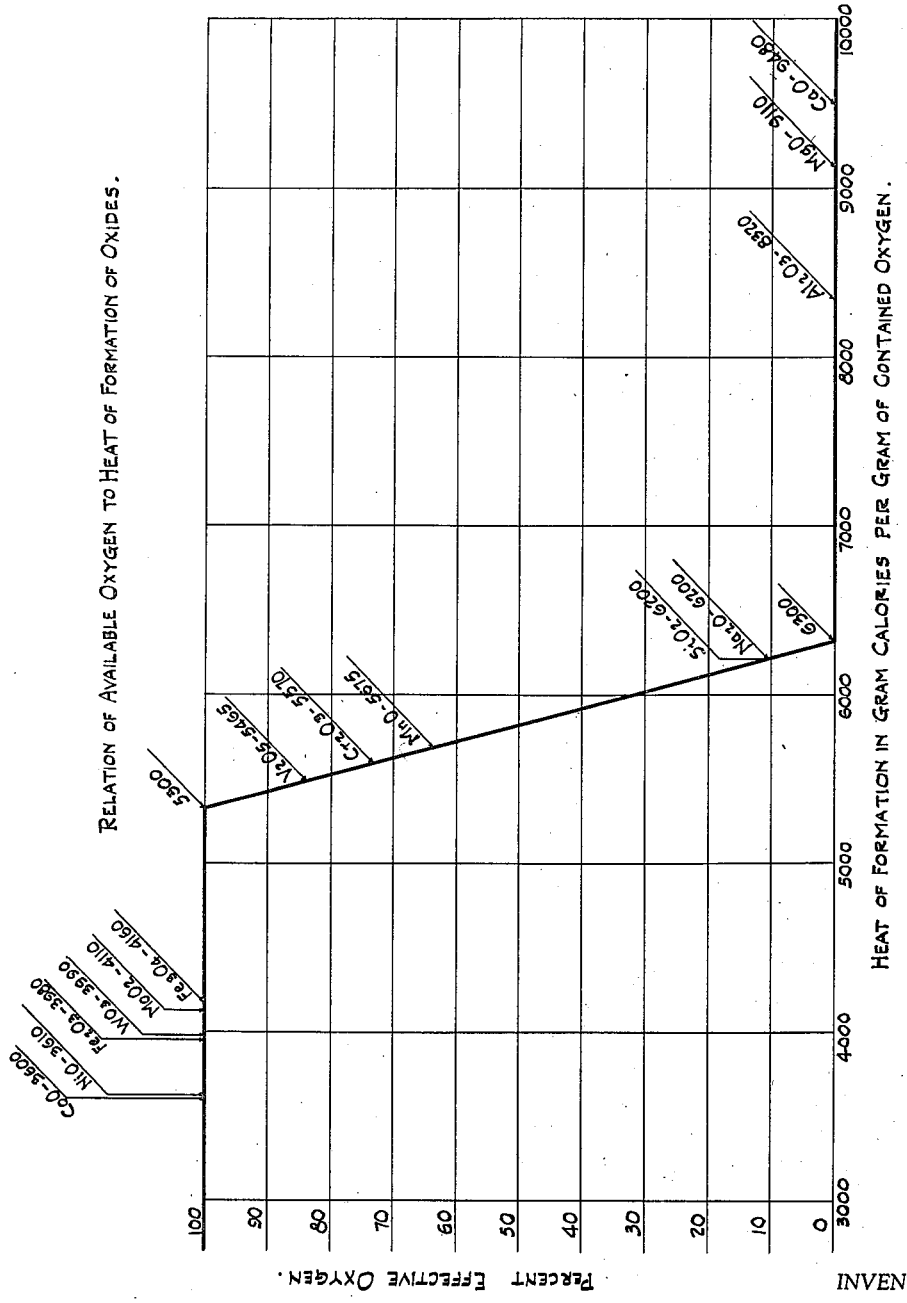
INVENTOR.
Louis J. Larson
BY
ATTORNEY.

Patented Nov. 19, 1935

2,021,628

UNITED STATES PATENT OFFICE 2,021,628

ARC WELDING ELECTRODE

Louis J. Larson, Milwaukee, Wis., assignor to A. O. Smith Corporation, Milwaukee, Wis., a corporation of New York Application November 2, 1934, Serial No. 751,116

23 Claims. (Cl. 219—8)

This invention relates generally to covered metallic electrodes for use in electric arc welding.

More specifically, the invention relates to covered electrodes with a covering which contains carbon or carbon compounds.

An object of the invention is to provide improved electrodes of this kind for use in arc welding.

Another object of the invention is to so proportion the ingredients entering into the composition of the covering as to produce a covered electrode of such characteristics as to substantially eliminate welding difficulties due to blow holes and side wall pits.

A further object of the invention is to provide an electrode which not only secures the substantial elimination of blow holes and side wall pits, but which also has a covering of such nature as to produce gases at the welding arc, during the consumption of the electrode, in sufficient volume and of suitable characteristics to thoroughly protect the weld metal being deposited from the deleterious effects of the atmosphere and to insure the production of weld metal of high strength and ductility.

Other objects of the invention will be apparent from the following detailed description of the invention and the way in which it is to be practiced.

In the welding of many structures, it is of importance to keep to a minimum such welding defects as blow holes and pits. Blow holes are gas cavities in the weld metal and are objectionable since they interrupt the continuity of the metal and to some extent lower the strength and ductility of the weld. The covered electrodes of this invention are particularly effective in reducing blow hole formation in the body of the weld.

Side wall pits are frequently encountered in depositing weld metal in grooves in plates which are to be welded together, particularly in deep grooves in thick plates. Side wall pits are surface irregularities which occur along the boundaries of the deposited weld metal and the walls of the groove in which it is deposited. Satisfactory welding technique requires that when these pits occur during the welding operation, they must be chipped out when the deposited weld metal is cleaned in preparation for the deposition of the succeeding layer, or at least that particular care be taken in depositing the next layer of weld metal to insure that the pits are melted out and filled with metal, and not simply covered over by the later deposited metal leaving a series of cavities filled with gas or slag along the boundary of the plates and the weld metal.

This invention provides welding electrodes of such characteristics that when welding with them, blow holes and side wall pits are substantially eliminated by virtue of the properties of the electrodes, and without the necessity of any particular pains to prevent their occurrence. While it has not been impossible to produce welds of high quality metal substantially free from blow holes and side wall pits by the use of previously known electrodes, my improved electrodes greatly simplify the production of such welds and consequently possess advantages which are readily apparent to the welding art.

This invention is based upon the discovery that electrodes with coverings which contain both carbon and oxygen give particularly favorable results when the amount of carbon in the covering bears a certain relation to a specified fraction of the total amount of oxygen in the covering. Electrodes with coverings in which there is not the proper relation between carbon and oxygen, do not give the same favorable results with respect to freedom from pits and blow holes that are obtained when the proportions are suitably adjusted.

The oxygen which is related to the carbon content of the electrode covering is not the total oxygen content of the covering, but only a certain fraction which is determined in accordance with the rules given below, and which will hereinafter be referred to in the specification and the claims as the effective oxygen to differentiate it from the total oxygen content of the covering. Different substances differ with respect to the fraction of their total oxygen content which is to be considered as effective oxygen. For metallic oxides the fraction of the total oxygen content which is effective oxygen is determined from the heat of formation of the oxide; for other substances which frequently are present in weldrod coverings, it is determined in accordance with the rules given below.

My tests on a considerable number of covered electrodes show that when the effective oxygen in each constituent of the covering is determined in the way specified herein, and the carbon content of the covering is properly balanced against the sum of the amounts of effective oxygen contributed by the different constituents, there is produced an electrode characterized by particularly favorable properties with respect to freedom from the formation of pits and blow holes.

The relation between the heat of formation of a metallic oxide and the fraction of its total oxygen content which is effective oxygen can be represented with sufficient accuracy by a graph of the form shown in the sole figure in the drawing. The abscissas are the heats of formation of different metallic oxides in gram calories per gram of contained oxygen, the values of the heats of formation used being those given in the International Critical Tables. The ordinates represent the effective oxygen as a percentage of the total oxygen which the oxide contains. The graph consists of three connected straight lines, two of which are parallel to the axis of abscissas with ordinates of 100% and 0%, respectively, and are joined by a sloping line. For metallic oxides with heats of formation less than 5300 calories per gram of contained oxygen, the oxygen content is 100% effective; for oxides with heats of formation greater than 6300 calories per gram of contained oxygen, none of the oxygen is effective; while for the oxides with intermediate heats of formation the percentage of effective oxygen decreases as the heat of formation per gram of contained oxygen increases. The positions occupied by a number of the more common metallic oxides are shown on the graph, each oxide being identified by its chemical symbol.

Referring to the graph, it will be seen, for example, that 10% of the oxygen in silica or silicon dioxide, $SiO_2$, is effective oxygen. Since silica consists of 53.3% oxygen by weight, and 10% of this oxygen is effective oxygen, it follows that the weight of effective oxygen in silica is .10 times 53.3 or 5.33% of the weight of the silica. Similar calculations for each of the other oxides give the weight of effective oxygen as a fraction of the weight of the oxide.

The weldrod covering will ordinarily also contain a certain amount of oxygen in other forms than in combination with metals as metallic oxides. Some coverings will contain organic carbon compounds such as carbohydrates; or cellulose such as paper fibers or cotton; or cellulosic material such as wood flour; while practically all, if not all, coverings will contain a certain amount of water. The oxygen content of such substances is one hundred per cent effective and is to be added to the effective oxygen contained in the metallic oxides in order to obtain the total effective oxygen in the covering.

Water is commonly present in weldrod coverings in different forms, part as water of combination in certain chemical compounds or water so firmly bound to the other constituents as to be expelled only with great difficulty, while part is present in the form of free moisture which is expelled from the covering by heating to a temperature slightly above 100° C. In welding, the electrode and its covering are heated to some extent before the covering is carried into the welding arc where it is converted into gas and slag by the intense heat of the arc. During this heating a portion of the free moisture is expelled and is lost, carrying with it its effective oxygen. The proportion of free moisture which is lost depends to some extent upon the nature of the covering, and proper allowance for this loss of free moisture and its effective oxygen content should desirably be made in calculating the sum total of effective oxygen present in the covering when it is converted in part into gas, and in part into slag, at the welding arc.

It is preferable that the amount of free moisture in the covering be kept low in order that the effective oxygen required to properly balance the carbon content of the covering may be largely supplied by constituents other than the free moisture. While my invention contemplates any covered electrodes in which superior results are obtained by properly adjusting the ratio between the carbon and effective oxygen contents of the covering, irrespective of whether the proper ratio is secured by the use of a covering with a low oxide content and a high free moisture content, or a covering with a high oxide content and a low free moisture content, and while my tests also show that the advantages which are obtained by the use of either of these expedients may be secured by the use of the other, it has been found preferable to employ coverings in which the free moisture content is sufficiently small to insure that the maximum amount of effective oxygen which would be contributed by the free moisture content even if none were lost, is not more than some ten to twenty per cent of the effective oxygen content furnished by all the other constituents of the covering, and is desirably even less than this. One of the advantages of an electrode covering with a low free moisture content is that after it is adjusted to have a suitable ratio of carbon to effective oxygen, the absorption of free moisture by the covering when it is stored prior to use results in no substantial change in the ratio because the moisture is expelled to a considerable extent by the heat to which the covering is exposed before it reaches the welding arc.

A certain amount of effective oxygen will also be contributed by metallic carbonates or hydroxides if such are present in the covering. A carbonate may be considered as an oxide plus carbon dioxide, a hydroxide as an oxide plus water. The oxygen contained in the carbon dioxide or water in a carbonate or a hydroxide, respectively, is one hundred per cent effective, while the effectiveness of the oxygen in the metallic oxide which remains as the residue of the carbonate or hydroxide when it is decomposed by heat, is found by reference to the graph showing the effective oxygen in metallic oxides.

In some cases metallic oxides are present in an electrode covering in combination with each other. Kaolin, which is frequently a desirable constituent in an electrode covering, contains aluminum oxide, silicon oxide, and combined water. The effective oxygen in such materials is obtained by summing up the amounts of effective oxygen in the different oxides in the compound, using for this purpose the percentages of effective oxygen in the individual oxides as shown by the graph. Reference to the graph shows that the aluminum oxide in kaolin contributes no effective oxygen, while the effective oxygen in the silica is 10% of the oxygen it contains. All of the oxygen in the water content of the kaolin is effective oxygen.

The effective oxygen content of a covering is readily calculated from a chemical analysis of the covering. Such an analysis will ordinarily not show the amount of a substance like kaolin, but will give the amount of silica, alumina, and other oxides which the covering contains. The silica content of the covering will be the sum of the amounts of silica contained in the kaolin, the sodium silicate, and any other silica containing substance which may be present. Since the effective oxygen content of an oxide is the same irrespective of whether the oxide is present in the covering in the form of the pure oxide, or is combined with other oxides to form compounds such as kaolin, or is combined with water or carbon dioxide to form a hydroxide or carbonate, the total effective oxygen content of the covering is obtained from the chemical analysis by summing up the effective oxygen contents of the different metallic oxides shown by the chemical analysis, the percentage of effective oxygen for each oxide being obtained from the curve shown in the sole figure of the drawing, and adding to this sum the effective oxygen contributed by the other constituents of the covering, such as organic material, carbon dioxide in carbonates, and combined water and free moisture.

The nature of the calculations used to determine the ratio of carbon to effective oxygen in an electrode covering may be illustrated in connection with a covering for mild steel electrodes to be used in welding steel structures. The covering contains carbon in the form of charcoal, metallic manganese which may be in ferromanganese, and several metallic oxides as well as a certain amount of water. A suitable mix for the covering may consist of the following ingredients with the proportions given in parts by weight:

| Ingredient | Parts by weight |
|---|---|
| Charcoal | 145 |
| Kaolin | 800 |
| Iron oxide, $Fe_3O_4$ | 560 |
| Ferromanganese | 200 |
| Sodium silicate | 688 |

The iron oxide used may be mill scale, if desired, which has a composition corresponding closely to the chemical formula $Fe_3O_4$. Sodium silicate having a Baumé of 42° and a ratio of silica to sodium oxide of about 3.2 is suitable for use in the covering, but other sodium silicate solutions can be used.

In making the electrode covering, the ingredients are thoroughly mixed, and the covering mixture is then applied to the metal core of the electrode, preferably by extrusion. The sodium silicate serves as a binder to hold the covering to the weldrod. The electrodes with the covering applied are then baked to expel the major portion of the water contained in the covering mix. With $\frac{1}{8}$" electrodes excellent results have been secured with a covering 1/40" thick; for ¼" electrodes a covering $\frac{1}{32}$" may be used; and for ⅜" electrodes a covering thickness of 3/64" is suitable. While there have been illustrated covering thicknesses which have been found to be satisfactory, the invention is not limited to the use of coverings of such thickness since covering thicknesses materially different from those illustrated give satisfactory welding results.

It is apparent that if the weight of each ingredient entering into the covering composition is known, and that if there is also a chemical analysis, including the combined water and free moisture contents for each ingredient, then the weight of each oxide and other constituent in the original weldrod covering composition mix can be readily calculated. During the baking of the weldrod covering composition on the electrode, a considerable portion of the water which it contains is expelled. If the covered electrodes are weighed so that the weight of covering before and after baking is known, the weight of water lost on baking is readily determined. Subtracting the weight of the water expelled on baking from the total weight of water contained in the wet covering composition gives the total amount of water left in the baked covering. A simple moisture test on the electrode covering after it has been baked makes it possible to separate the water content of the baked covering into two parts, the combined water and free moisture. Thus from a knowledge of the weights and chemical constituencies of the ingredients used to make the covering composition mix, the loss of water on baking the covering, and a moisture test on the baked covering, it is possible to calculate the chemical constituency of the baked covering.

Alternatively, the baked covering may be analyzed chemically and its constituency determined irrespective of any knowledge of the ingredients used to make the covering mixture. Either method may be used, the chemical analysis being more direct and probably less subject to error, while the first method has some advantages in that when a great number of coverings are made by using different proportions of a small number of ingredients, the coverings need not be analyzed individually but the analysis can be computed from the analyses of the ingredients and the other data indicated. The analysis of the baked covering is then used for the determination of the ratio of carbon to effective oxygen.

The baked electrode covering made up from the covering composition previously given had the following analysis:

| Substance | Per cent by weight |
|---|---|
| Silica $SiO_2$ | 28.60 |
| Alumina $Al_2O_3$ | 15.83 |
| Sodium oxide $Na_2O$ | 3.12 |
| Iron oxide $Fe_3O_4$ | 28.22 |
| Carbon C | 6.82 |
| Manganese Mn | 8.07 |
| Iron (metallic) Fe | 1.23 |
| Carbon dioxide $CO_2$ | .45 |
| Hydrogen $H_2$ | .79 |
| Oxygen $O_2$ | 5.70 |
| Minor constituents, lime, magnesia, etc. | .55 |
| Moisture $H_2O$ | .62 |

The oxygen shown as a separate constituent is not the oxygen contained in the several metallic oxides shown in the table, but is the oxygen contained in the combined water of the covering, and possibly oxygen contained to a small extent in the charcoal which is one constituent of the covering. This oxygen is 100 per cent effective. The hydrogen is hydrogen from the charcoal and from the combined water in the covering.

From this analysis it is apparent that in one hundred parts of the baked electrode covering there are 6.82 parts of carbon and 0.45 part of carbon dioxide. The major portion of the carbon comes from the charcoal, and part from the ferro manganese which contains an appreciable percentage of carbon, but the source of the carbon is immaterial. The carbon dioxide contributes 0.12 part of carbon giving a total of 6.94 parts of carbon in one hundred parts of the covering. A small percentage of carbon dioxide is normally present in electrode coverings even though no carbonates are used in the covering composition, and may be due to the presence of small amounts of carbonates present as impurities in the other constituents used.

The amounts of effective oxygen contributed by the different constituents are shown in the following table. The first column gives the name of the constituent, the second its chemical formula, the third gives the percentage of its oxygen content which is to be figured as effective oxygen, these figures being taken from the graph and from the statements in this specification, the fourth gives the number of parts of the constituent contained in one hundred parts of the covering, and the last column gives the number of parts of effective oxygen contributed by the amount of each constituent contained in one hundred parts of the covering. In figuring the effective oxygen contributed by the free moisture it is to be remembered that while the oxygen in moisture is 100 per cent effective, a part of the moisture is lost when the electrode is used due to the heating of the covering before it reaches the welding arc. A loss of 50 per cent gives the figures tabulated for the effective oxygen contributed by free moisture.

| | | | | |
|---|---|---|---|---|
| Silica | SiO₂ | 10 | 28.60 | 1.52 |
| Sodium oxide | Na₂O | 10 | 3.12 | .08 |
| Iron oxide | Fe₃O₄ | 100 | 28.22 | 7.80 |
| Carbon dioxide | CO₂ | 100 | .45 | .33 |
| Oxygen | O₂ | 100 | 5.70 | 5.70 |
| Moisture | H₂O | 100 | .62 | .27 |
| Total | | | | 15.70 |

Reference to the graph given in the drawing shows that none of the oxygen contained in alumina, Al₂O₃, is effective oxygen. Alumina has consequently not been shown in the above table since it contributes no effective oxygen. Such minor constituents as lime and magnesia likewise contribute no effective oxygen and have also been omitted from the table. The other constituents of the covering, carbon, manganese, metallic iron, and hydrogen, contain no oxygen and can therefore contribute none to the effective oxygen content of the covering.

The sum total of the tabulated figures gives 15.70 parts by weight of effective oxygen for one hundred parts by weight of the electrode covering. Since there are 6.94 parts by weight of carbon for one hundred parts by weight of covering, the weight ratio of carbon to effective oxygen is 0.442. Expressed in terms of atomic ratio, there is 0.589 carbon atom for each atom of effective oxygen.

Tests made with other electrode coverings show that superior results with respect to freedom from pits and blow holes are obtained when the number of carbon atoms for each effective oxygen atom is close to 0.6 and is desirably not more than 10% greater or less than this figure, giving a range of about 0.54 to 0.66 for the ratio of carbon atoms to effective oxygen atoms.

The same ratio of carbon to effective oxygen atoms has been found to give superior results when the carbon is present in the covering in other forms than as charcoal.

The following is an example of a covering in which no charcoal is used, and in which the carbon is supplied principally by wood flour, some carbon also being contributed by the ferromanganese:

| Ingredient | Parts by weight |
|---|---|
| Wood flour | 13 |
| Silica flour | 4 |
| Kaolin | 8 |
| Ferromanganese | 6 |
| Iron oxide, Fe₃O₄ | 15 |
| Sodium silicate | 60 |

This electrode covering when baked and ready for use had the following analysis:

| Substance | Per cent by weight |
|---|---|
| Silica SiO₂ | 36.00 |
| Alumina Al₂O₃ | 4.21 |
| Sodium oxide Na₂O | 7.58 |
| Iron oxide Fe₃O₄ | 21.01 |
| Carbon C | 8.78 |
| Manganese Mn | 6.70 |
| Iron (metallic) Fe | 1.03 |
| Carbon dioxide CO₂ | .46 |
| Hydrogen H₂ | 1.45 |
| Oxygen O₂ | 10.95 |
| Minor constituents, lime, magnesia, etc | .25 |
| Moisture | 1.58 |

The oxygen shown in the analysis is that which is contained in the wood flour and combined water in the covering and is one hundred per cent effective. The hydrogen shown in the analysis also comes from the wood flour and combined water, but naturally plays no part in the ratio between carbon and effective oxygen. The weights of effective oxygen contributed by the constituents in one hundred parts of the covering are shown in the following table in which the entries in the different columns have the same significance as those in the corresponding columns of the similar table for the weldrod with charcoal in the covering.

| | | | | |
|---|---|---|---|---|
| Silica | SiO₂ | 10 | 36.00 | 1.92 |
| Sodium oxide | Na₂O | 10 | 7.58 | .20 |
| Iron oxide | Fe₃O₄ | 100 | 28.22 | 5.81 |
| Carbon dioxide | CO₂ | 100 | .45 | .33 |
| Oxygen | O₂ | 100 | 10.95 | 10.95 |
| Moisture | H₂O | 100 | 1.58 | .70 |
| Total | | | | 19.91 |

The sum total of effective oxygen is 19.91 parts by weight for one hundred parts of covering. Since one hundred parts of covering contain 8.78 parts of carbon and 0.46 part of carbon dioxide, the sum total of carbon is 8.91 parts. The weight ratio of carbon to effective oxygen is consequently 0.448, or the atomic ratio is 0.597 carbon atom to each atom of effective oxygen. For atomic ratios running from about 0.54 to 0.66, the same desirable properties with respect to freedom from pits and blow holes are found as for the charcoal containing covering.

In this case as in the preceding case, the loss of free moisture content is taken as fifty per cent. It will be noticed, however, that in both cases the free moisture content is low, and that the atomic ratio is not appreciably changed by taking the loss of free moisture to be either zero or one hundred per cent, the two extremes possible. Since the loss of free moisture may be expected to depend to some extent at least upon the nature of the covering, it is an advantage to keep the free moisture so low that it is not an important factor in contributing effective oxygen to the covering.

Electrodes provided with either of these coverings gave sound welds of good physical properties and no difficulties were experienced in welding due to pits and blow holes. The ferromanganese in the covering not only contributes to the carbon content of the covering but also exerts a control on the manganese content of the deposited weld metal which can be varied up or down by increasing or decreasing the manganese content of the covering, it being assumed of course that the manganese content of the steel rods to which the covering is applied remains substantially constant during these changes. In welding mild steel structures the most desirable welding results are generally obtained when the manganese content of the deposited weld metal is from about .30% to .70%, particularly .40% to .45%, and the manganese content of the covering should be so adjusted as to produce weld metal having a suitable content of manganese.

The importance of a suitable ratio of carbon to effective oxygen in the elimination of pits and blow holes is shown by the results of tests made with other electrode coverings which gave a different ratio of carbon to effective oxygen. It was found that particularly favorable results were obtained when the ratio of carbon atoms to effective oxygen atoms in the covering ranged from about 0.54 to 0.66 carbon atom per atom of effective oxygen, while outside this range difficulties were experienced with pits or blow holes, or both. Organic and inorganic carbon compounds, metal carbides, and alloys containing carbon such as ferromanganese, all contribute to the total carbon content of the covering in proportion to the percentages of carbon which they contain and the amounts in which they are present in the covering. My invention, therefore, contemplates broadly electrodes with coverings which contain carbonaceous material and ingredients which supply effective oxygen, the proportions of the different constituents of the covering being so balanced as to give the ratio of carbon to effective oxygen which provides particularly favorable results.

Other examples of electrode coverings which give ratios of carbon to effective oxygen which fall within the scope of this invention and the advantages which are obtained by the use of this ratio are the following:

| Ingredient | Parts by weight |
|---|---|
| Wood flour | 13 |
| Silica flour | 4 |
| Kaolin | 8 |
| Ferromanganese | 6 |
| Vanadium oxide, $V_2O_5$ | 10 |
| Sodium silicate | 60 |

Another covering composition mixture is given below:

| Ingredient | Parts by weight |
|---|---|
| Wood flour | 13 |
| Silica flour | 4 |
| Kaolin | 8 |
| Ferromanganese | 6 |
| Nickel oxide, NiO | 18 |
| Sodium silicate | 60 |

The coverings are applied to the metal core of the electrode and baked to leave only a few per cent of free moisture, and are then ready for use. These coverings had atomic ratios of carbon to effective oxygen atoms which were 0.605 and 0.608 respectively.

In the last two examples no iron oxide is used but the nickel and vanadium oxides supply the effective oxygen which was furnished in preceding examples by iron oxide. The use of such oxides as those of nickel or vanadium or of other alloying elements is desirable in cases in which the presence of certain alloying constituents is essential in the weld metal in order to confer physical properties not obtainable in plain carbon steels.

In the consumption of the electrode and its covering during the welding operation, those metallic oxides which provide effective oxygen are reduced to some extent and a part at least of the metal which is formed by the reduction of the oxide finds its way into the deposited weld metal and alloys with it. Thus when coverings of the kind described are applied to mild steel electrodes and used in welding, it is found that the weld metal has a higher silicon content than the electrode due to the reduction of silica in the covering and the alloying of the silicon produced with the weld metal. When coverings which contain nickel or vanadium or other reducible oxides are used, the corresponding metals are found in the deposited weld metal. Presumably, also, when iron oxide is used in the covering, iron is reduced from the oxide in the covering and finds its way into the weld metal, but of course is not shown by analysis since the weld metal is predominantly iron.

In welding mild steel structures the use of coverings which contain iron oxide is frequently of an advantage because the iron introduced into the weld metal from the covering is so nearly the composition of the deposited metal as to cause no sensible change in chemical composition. Some silicon is also introduced if the covering contains silica, but the silicon is of value in weld metal because of its well known deoxidizing properties.

For other welding purposes, on the contrary, it is sometimes desired to have alloying metals present in the weld metal to confer strength or other properties upon it. In such cases the oxide of the metal which is desired as an alloying ingredient is added to the covering, provided, of course, that the oxide is one which is reduced during the welding. This oxide may be used in place of iron oxide or along with it. The examples of electrode covering which have been given with nickel and vanadium oxide in the covering give good results with respect to freedom from blow holes and pits but introduce so much nickel or vanadium into the weld metal that the physical properties of the weld are less satisfactory in some respects than are obtained with smaller amounts of the alloying ingredients. For this reason, and also because the oxides of alloying materials are in general more expensive than iron oxide, it is an advantage in such cases to use the oxide of the alloying element in only such amounts as are necessary to introduce the desired quantity of the alloying element into the weld metal and to balance the ratio between carbon and effective oxygen by the addition of iron oxide, suitable allowance being of course made for the effective oxygen contributed by the oxide of the alloying element, and by the other oxides in the covering. If more than one alloying element is desired in the weld metal, the corresponding oxides may be used in the covering, either with or without iron oxide which may again prove to be of value for the same reasons as for the case when the oxide of only one alloying element is added. Consequently the invention is one of considerable scope and is applicable to the production of electrode coverings compounded from many different ingredients, the benefits of the invention with respect to freedom from blow holes and pits being obtained by the balance of carbon and effective oxygen to give a ratio within the limits which have been specified.

Not all elements which have reducible oxides can be alloyed with the weld metal by the introduction of their oxides into the covering. My tests indicate that sodium oxide carries the same percentage of effective oxygen as silicon dioxide and should be reduced to some extent in the welding operation. However, metallic sodium has a high vapor pressure at the temperature of molten steel and it is not introduced into the steel to any appreciable extent. But while sodium and possibly some other metals may have properties such that they are not readily incorporated into the weld metal, the greater number of alloying ingredients such as nickel, silicon, chromium, vanadium, cobalt, tungsten, and molybdenum are of such nature that they readily alloy with the weld metal if their oxides are placed in the covering. By thus incorporating the oxides in the covering the weld metal may be controlled in chemical constituency and given properties which are not obtainable with plain carbon steel.

In view of the fact that the properties of the weld metal may be favorably affected by the use of proper covering ingredients, it is but natural that they may be unfavorably affected by the use in the covering of ingredients which either before or after reduction enter into the weld metal and exert a deleterious effect upon its properties. It is not indispensable that all elements which are injurious to steel should be excluded from the covering composition, since oxygen, which is harmful to steel, is present in the covering but, in the practice of this invention, does not enter into the weld in sufficient quantities to injure its properties. This characteristic is doubtless not peculiar to oxygen alone, and it therefore seems probable that other elements which are injurious to steel may be present in the covering without being transferred to the weld metal, at least to a harmful extent. It is clear, however, that if harmful constituents are excluded from the covering, no contamination of the weld metal from this source is possible.

I claim:

1. A covered electrode for electric arc welding comprising a ferrous metal core and a covering which comprises carbonaceous material, and at least one ingredient which contains oxygen, the proportion of the materials in the covering being such that the ratio of carbon atoms to effective oxygen atoms is from about 0.54 to about 0.66.

2. A covered electrode for metallic arc welding comprising a steel core and a covering which comprises carbonaceous material, an ingredient which contains manganese, and at least one ingredient which contains oxygen, the proportion of the materials in the covering being such that the ratio of carbon atoms to effective oxygen atoms is from about 0.54 to about 0.66.

3. A covered electrode for metallic arc welding comprising a steel core and a covering which comprises carbon, an ingredient which contains manganese, and at least one ingredient which contains oxygen, the proportion of the materials in the covering being such that the ratio of carbon atoms to effective oxygen atoms is from about 0.54 to about 0.66.

4. A covered electrode for metallic arc welding comprising a steel core and a covering which comprises cellulosic material, an ingredient which contains manganese, and at least one ingredient which contains oxygen, the proportion of the materials in the covering being such that the ratio of carbon atoms to effective oxygen atoms is from about 0.54 to about 0.66.

5. A covered electrode for electric arc welding comprising a steel core and a covering which comprises manganese in sufficient quantity to cause the manganese content of the weld metal to have a value of from about 0.30% to about 0.70%, a substance which contains carbon, and at least one substance selected from the group consisting of the metallic oxides, carbonates, and hydroxides, the proportions of the substances in the covering being such that the ratio of carbon atoms to effective oxygen atoms is from about 0.54 to about 0.66, and the covering being of a thickness to produce a sufficient volume of protecting gases to shield the deposited weld metal from contamination by the atmosphere and cause the formation of a strong and ductile weld.

6. A covered electrode for electric arc welding comprising a steel core and a covering which comprises manganese in sufficient quantity to cause the manganese content of the weld metal to have a value of from about 0.30% to about 0.70%, carbon, and at least one substance selected from the group consisting of the metallic oxides, carbonates, and hydroxides, the proportions of the substances in the covering being such that the ratio of carbon atoms to effective oxygen atoms is from about 0.54 to about 0.66, and the covering being of a thickness to produce a sufficient volume of protecting gases to shield the deposited weld metal from contamination by the atmosphere and cause the formation of a strong and ductile weld.

7. A covered electrode for electric arc welding comprising a steel core and a covering which comprises manganese in sufficient quantity to cause the manganese content of the weld metal to have a value of from about 0.30% to about 0.70%, cellulosic material, and at least one substance selected from the group consisting of the metallic oxides, carbonates, and hydroxides, the proportions of the substances in the covering being such that the ratio of carbon atoms to effective oxygen atoms is from about 0.54 to about 0.66, and the covering being of a thickness to produce a sufficient volume of protecting gases to shield the deposited weld metal from contamination by the atmosphere and cause the formation of a strong and ductile weld.

8. A covered electrode for use in electric arc welding for the production of alloy steel weld metal comprising a plain carbon steel core and a covering which comprises carbonaceous material and substances which contain oxygen, at least one of the oxygen containing substances being the oxide of an alloying element which is reduced from the oxide and alloyed with the weld metal during the welding operation, the proportions of the substances in the covering being such that the ratio of carbon atoms to effective oxygen atoms is from about 0.54 to about 0.66.

9. A covered electrode for electric arc welding comprising a steel core and a covering which comprises carbon, preferably in the form of charcoal, kaolin, iron oxide, ferromanganese, and sodium silicate, the proportion of the materials in the covering being such that the ratio of carbon atoms to effective oxygen atoms is from about 0.54 to about 0.66.

10. A covered electrode for electric arc welding comprising a steel core and a covering which comprises carbon, preferably in the form of charcoal, kaolin, iron oxide, the oxide of an alloying element which is reduced from the oxide and alloyed with the weld metal during the welding operation, ferromanganese, and sodium silicate, the proportion of the materials in the covering being such that the ratio of carbon atoms to effective oxygen atoms is from about 0.54 to about 0.66.

11. A covered electrode for electric arc welding comprising a steel core and a covering which comprises wood flour, silica flour, kaolin, ferromanganese, iron oxide, and sodium silicate, the proportion of the materials in the covering being such that the ratio of carbon atoms to effective oxygen atoms is from about 0.54 to about 0.66.

12. A covered electrode for electric arc welding comprising a steel core and a covering which comprises wood flour, silica flour, kaolin, ferromanganese, iron oxide, and the oxide of an alloying element which is reduced from the oxide and alloyed with the weld metal during the welding operation, the proportion of the materials in the covering being such that the ratio of carbon atoms to effective oxygen atoms is from about 0.54 to about 0.66.

13. A covered electrode for electric arc welding comprising a steel core and a covering which comprises wood flour, silica flour, kaolin, ferromanganese, vanadium oxide, and sodium silicate, the proportion of the materials in the covering being such that the ratio of carbon atoms to effective oxygen atoms is from about 0.54 to about 0.66.

14. A covered electrode for electric arc welding comprising a steel core and a covering which comprises wood flour, silica flour, kaolin, ferromanganese, nickel oxide, and sodium silicate, the proportion of the materials in the covering being such that the ratio of carbon atoms to effective oxygen atoms is from about 0.54 to about 0.66.

15. A covering for electrodes for electric arc welding which contains both carbon and oxygen, the proportions of carbon and oxygen being such that there is from about 0.54 to about 0.66 carbon atom for each atom of effective oxygen.

16. A composition of matter for protecting weld metal from the deleterious effects of the atmosphere in electric arc welding, which contains carbon and oxygen in such proportion that there is from about 0.54 to about 0.66 carbon atom for each atom of effective oxygen.

17. A covering composition mixture to be applied to a steel core and dried to form a covered electrode for electric arc welding which comprises essentially about 145 parts by weight charcoal, about 800 parts kaolin, about 560 parts iron oxide, about 200 parts ferromanganese, and about 688 parts sodium silicate solution.

18. A covering composition mixture to be applied to a steel core and dried to form a covered electrode for electric arc welding which comprises essentially about 13 parts by weight wood flour, about 4 parts silica flour, about 8 parts kaolin, about 6 parts ferromanganese, about 15 parts iron oxide, and about 60 parts sodium silicate solution.

19. A covering composition mixture to be applied to a steel core and dried to form a covered electrode for electric arc welding which comprises essentially about 13 parts by weight wood flour, about 4 parts silica flour, about 8 parts kaolin, about 6 parts ferromanganese, about 10 parts vanadium oxide, and about 60 parts sodium silicate solution.

20. A covering composition mixture to be applied to a steel core and dried to form a covered electrode for electric arc welding which comprises essentially about 13 parts by weight wood flour, about 4 parts silica flour, about 8 parts kaolin, about 6 parts ferromanganese, about 18 parts nickel oxide, and about 60 parts sodium silicate solution.

21. A covered electrode for metallic arc welding comprising a steel core and a covering which comprises carbonaceous material, an ingredient which contains manganese, and at least one ingredient which contains oxygen, the proportion of the materials in the covering being such that the ratio of carbon atoms to effective oxygen atoms is about 0.54.

22. A covered electrode for metallic arc welding comprising a steel core and a covering which comprises carbonaceous material, an ingredient which contains manganese, and at least one ingredient which contains oxygen, the proportion of the materials in the covering being such that the ratio of carbon atoms to effective oxygen atoms is about 0.66.

23. A covered electrode for electric arc welding comprising a steel core and a covering which comprises carbonaceous material, an ingredient which contains manganese, and at least one ingredient which contains oxygen, the proportions of the materials in the covering being such as to give from about 0.54 to 0.66 carbon atom for each effective oxygen atom to produce a strong and ductile weld substantially free from pits and blow holes.

LOUIS J. LARSON.